United States Patent
Matsuura

(10) Patent No.: US 8,649,295 B2
(45) Date of Patent: Feb. 11, 2014

(54) COURSE SEARCHING METHOD AND NODE DEVICE

(75) Inventor: Masahiko Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 13/422,324

(22) Filed: Mar. 16, 2012

(65) Prior Publication Data

US 2012/0176940 A1 Jul. 12, 2012

Related U.S. Application Data

(63) Continuation of application No. PCT/JP2009/066372, filed on Sep. 18, 2009.

(51) Int. Cl.
*H04L 12/28* (2006.01)
*G06F 15/173* (2006.01)

(52) U.S. Cl.
USPC .......................... 370/254; 370/351; 709/224

(58) Field of Classification Search
None
See application file for complete search history.

(56) References Cited

U.S. PATENT DOCUMENTS

| | | | | |
|---|---|---|---|---|
| 7,443,833 | B2* | 10/2008 | Ayyagari | 370/351 |
| 7,995,501 | B2* | 8/2011 | Jetcheva et al. | 370/255 |
| 8,139,504 | B2* | 3/2012 | Mankins et al. | 370/254 |
| 8,369,707 | B2* | 2/2013 | D'Alessandro et al. | 398/79 |
| 2004/0218548 | A1* | 11/2004 | Kennedy et al. | 370/254 |
| 2004/0218582 | A1* | 11/2004 | Kennedy et al. | 370/351 |
| 2008/0008091 | A1 | 1/2008 | Yumoto et al. | |
| 2008/0069082 | A1* | 3/2008 | Patrick | 370/351 |
| 2010/0054155 | A1* | 3/2010 | Cai et al. | 370/254 |
| 2012/0176931 | A1* | 7/2012 | Jetcheva et al. | 370/254 |

FOREIGN PATENT DOCUMENTS

| | | |
|---|---|---|
| JP | 11-163890 | 6/1999 |
| JP | 2001-268122 | 9/2001 |
| JP | 2006-166158 | 6/2006 |
| JP | 2006-254051 | 9/2006 |
| JP | 2007-74055 | 3/2007 |
| JP | 2008-17409 | 1/2008 |
| JP | 2009-55357 | 3/2009 |

OTHER PUBLICATIONS

Japanese Office Action mailed May 21, 2013 in corresponding Japanese Patent Application No. 2011-531723.
Patent Abstracts of Japan, Publication No. 2001-268122, Published Sep. 28, 2001.
Patent Abstracts of Japan, Publication No. 2006-254051, Published Sep. 21, 2006.
International Search Report for PCT/JP2009/066372 mailed Nov. 2, 2009.

* cited by examiner

*Primary Examiner* — Clemence Han
(74) *Attorney, Agent, or Firm* — Staas & Halsey LLP

(57) ABSTRACT

A node device for searching for a course between start and end points in a network under constraining conditions includes a holding unit holding the constraining conditions corresponding to node devices and links connecting the node devices and indexes corresponding to the node devices and the links as network topology information; a making unit making combinations of the constraining conditions from which a part of the constraining conditions is removed; a searching unit searching for the course between the start point and the end point under the constraining conditions; a joining unit obtaining a joined result by joining the successfully searched for course to the network topology information; and a presenting unit comparing a piece of the network topology information corresponding to course information of the successfully searched for course with the removed part, extracting a nonconforming portion, and storing the joined result and the extracted nonconforming portion.

7 Claims, 25 Drawing Sheets

| ROW | TOTAL COST | COURSE | NONCONFORMING PORTION 1 | NONCONFORMING PORTION 2 | NONCONFORMING PORTION 3 |
|---|---|---|---|---|---|
| (1) | 14 | x → a → c → h → y | LINK h  A(10^-5) | NODE 4  C(7) | |
| (2) | 14 | x → a → d → e → h → y | LINK d  A(10^-7) | NODE 4  C(7) | LINK h  A(10^-7) |
| (3) | 15 | x → f → i → y | LINK i  B(11) | | |
| (4) | 15 | x → b → e → h → y | LINK h  A(10^-7) | | |
| (5) | 17 | x → j → k → i → y | NODE 7  C(5) | | |
| ... | ... | ... | ... | ... | |

FIG.6

| TYPE | | SUMMARY |
|---|---|---|
| Type 1 | Link Type | TYPE OF LINK<br>1 : point-to-point    OTHER THAN LCN<br>2 : Multi Access      LCN |
| Type 2 | Link ID | IDENTIFYING OPPOSITE END OF THE LINK.<br>IN CASE OF P2P, NODE ID OF ADJACENT ROUTER IS INPUT.<br>IN CASE OF MA, I/F ADDRESS OF DR IS INPUT.<br>*CONTENTS SAME AS Link ID FIELD OF<br>Router LSA ARE CONSTANTLY STORED. |
| Type 3 | Local Interface IP Address | IP ADDRESS CORRESPONDING TO THE LINK.<br>IN CASE WHERE PLURAL IP ADDRESS ARE<br>ALLOCATED, LIST ALL.<br>IN CASE OF Unnumbered, Loop back IP. |
| Type 4 | Remote Interface IP Address | IP ADDRESS OF ADJACENT NODE CONNECTED BY THE LINK.<br>Type3/4 IS USED TO FIND PLURAL LINKS<br>BETWEEN NODES.<br>IN CASE OF Link Type=MA, DO NOT SEND 0.0.0.0 OR Type 4.<br>IN CASE OF Unnumbered, Loop back IP. |
| Type 5 | Traffic Engineering Metric | METRIC OF THE LINK.<br>THERE IS CASE WHERE DO NOT MATCH METRIC OF OSPF.<br>(e.g., Manual SETUP)<br>SAME CALCULATION METHOD AS OSPF |
| Type 6 | Maximum Bandwidth | MAXIMUM BANDWIDTH USABLE IN THE LINK.<br>REPRESENTING BANDWIDTH IN TRANSMISSION (NEIGHBOR)<br>DIRECTION FROM NODE WHICH HAS ISSUE THE LSA.<br>UNIT IS [Byte/Sec], CORRESPONDING TO n OF OC[n]. |
| Type 7 | Maximum Reservable Bandwidth | MAXIMUM BANDWIDTH WHICH CAN BE RESERVED IN THE LINK.<br>MAY BECOME GREATER THAN Type 6.<br>DEFAULT MAXIMUM BANDWIDTH VALUE IS<br>THE SAME AS Type 6 (USER CAN SET).<br>UNIT IS [Byte/Sec]. |
| Type 8 | Unreserved Bandwidth | VACANT BANDWIDTH WHICH CAN BE RESERVED IN THE LINK.<br>VALUES FOR 8 STAGES OF PRIORITIES ARE SET.<br>INITIAL VALUE (BEFORE RESERVATION) IS THE SAME AS<br>THAT OF Type 6 AND ALWAYS SMALLER THAN IN Type 7.<br>DECREASES AS XCON INCREASES.<br>UNIT IS [Byte/Sec]. |
| Type 9 | Administrative Group | MANAGEMENT GROUP TO WHICH THE LINK BELONGS IS<br>EXPRESSED BY bitmap.<br>CALLED "Resource Class/Color". |

FIG.7

| TYPE | SUMMARY |
|---|---|
| Type 11 | Link Local/ Remote Identifiers | IDENTIFIERS ON BOTH END NODES OF THE LINK. USED IN CASE OF Unnumbered LINK. SETTING 0 IN CASE WHERE IDENTIFIER ON REMOTE SIDE IS UNKNOWN. |
| Type 14 | Link Protection Type | PROTECTION IDENTIFIER OF THE LINK. <table><tr><th>VALUE</th><th>PROTECTION TYPE</th></tr><tr><td>0x01</td><td>Extra Traffic</td></tr><tr><td>0x02</td><td>Unprotected</td></tr><tr><td>0x04</td><td>Shared</td></tr><tr><td>0x08</td><td>Dedicated 1:1</td></tr><tr><td>0x10</td><td>Dedicated 1+1</td></tr><tr><td>0x20</td><td>Enhanced</td></tr><tr><td>0x40</td><td>Reserved</td></tr><tr><td>0x80</td><td>Reserved</td></tr></table> |
| Type 15 | Interface Switching Capability Descriptor | SWITCH TYPE OF I/F CONNECTED TO THE LINK. <table><tr><th>VALUE</th><th>SWITCH TYPE</th></tr><tr><td>1</td><td>Packet-Switch Capable-1 (PSC-1)</td></tr><tr><td>2</td><td>Packet-Switch Capable-2 (PSC-2)</td></tr><tr><td>3</td><td>Packet-Switch Capable-3 (PSC-3)</td></tr><tr><td>4</td><td>Packet-Switch Capable-4 (PSC-4)</td></tr><tr><td>51</td><td>Layer-2 Switch Capable (L2SC)</td></tr><tr><td>100</td><td>Time-Division-Multiplex Capable (TDM)</td></tr><tr><td>150</td><td>Lambda-Switch Capable (LSC)</td></tr><tr><td>200</td><td>Fiber-Switch Capable (FSC)</td></tr></table> |
| Type 16 | Shared Risk Link Group | AGGREGATE OF LINK INFLUENCED BY FAILURE. IN CASE WHERE MULTIPLEXED UPPER LINK LAYER GROUP EXIST ON LOWER LINK LAYER. UPPER LINK LAYERS TAKE SAME SHARED RISK GROUP. SHARED RISK GROUP TAKES UNIQUE VALUE IN NETWOWRK. |
| Type XX | Bit Error Rate | STORING LINE ERROR RATES FOR EACH LINK. UNIT IS $10^{-X}$ (X IS INDEX NUMBER). |
| Type XY | Transport Delay | STORING TRANSMISSION DELAY TIMES FOR EACH LINK. UNIT IS ms. |
| Type YY | Node MTBF | STORING MEAN TIME BETWEEN FAILURES OF NODE TO WHICH LINK BELONGS. UNIT IS month. |

FIG.8

| NODE ID | LINK ID | OSPF COST | ETC. | ERROR RATE | TRANSMISSION DELAY TIME [ms] | NODE MTBF [MONTH] |
|---|---|---|---|---|---|---|
| 1 | x | 4 | ... | 10^-8 | 5 | 36 |
| 1 | a | 5 | ... | 10^-8 | 5 | 36 |
| 1 | b | 10 | ... | 10^-6 | 10 | 36 |
| 1 | f | 5 | ... | 10^-7 | 10 | 36 |
| 1 | j | 5 | ... | 10^-5 | 7 | 36 |
| 2 | a | 5 | ... | 10^-8 | 8 | 24 |
| 2 | c | 7 | ... | 10^-6 | 12 | 24 |
| 2 | d | 4 | ... | 10^-7 | 6 | 24 |
| 3 | b | 10 | ... | 10^-5 | 7 | 12 |
| 3 | c | 4 | ... | 10^-8 | 7 | 12 |
| 3 | e | 3 | ... | 10^-6 | 8 | 12 |
| 3 | g | 6 | ... | 10^-7 | 10 | 12 |
| 4 | c | 7 | ... | 10^-5 | 10 | 7 |
| 4 | e | 3 | ... | 10^-8 | 14 | 7 |
| 4 | h | 2 | ... | 10^-5 | 14 | 7 |
| 5 | f | 5 | ... | 10^-7 | 14 | 8 |
| 5 | g | 6 | ... | 10^-5 | 9 | 8 |
| 5 | i | 10 | ... | 10^-8 | 11 | 8 |
| 5 | k | 2 | ... | 10^-6 | 10 | 8 |
| 6 | h | 2 | ... | 10^-7 | 10 | 10 |
| 6 | i | 10 | ... | 10^-5 | 11 | 10 |
| 6 | l | 14 | ... | 10^-8 | 10 | 10 |
| 6 | y | 5 | ... | 10^-8 | 5 | 12 |
| 7 | j | 5 | ... | 10^-6 | 11 | 5 |
| 7 | k | 2 | ... | 10^-7 | 10 | 5 |
| 7 | l | 14 | ... | 10^-5 | 10 | 5 |

| NODE ID | LINK ID |
|---------|---------|
| 1 | x |
| 1 | f |
| 5 | i |
| 6 | y |

FIG.12

| NODE ID | LINK ID | OSPF COST | ETC. | ERROR RATE | TRANSMISSION DELAY TIME [ms] | NODE MTBF [MONTH] |
|---|---|---|---|---|---|---|
| 1 | x | 4 | ... | $10^{-8}$ | 5 | 36 |
| 1 | f | 5 | ... | $10^{-7}$ | 10 | 36 |
| 5 | i | 10 | ... | $10^{-8}$ | 9 | 8 |
| 6 | y | 5 | ... | $10^{-8}$ | 5 | 12 |

FIG.13

| ROW | CONSTRAINING CONDITION | COURSE | NONCONFORMING PORTION 1 | NONCONFORMING PORTION 2 | NONCONFORMING PORTION 3 |
|---|---|---|---|---|---|
| [1] | A B C | NO COURSE | | | |
| [2] | A B | x→j→l→y | NODE 7  C(8) | | |
| [3] | B C | NO COURSE | | | |
| [4] | C A | x→f→i→y | LINK i  B(11) | | |
| [5] | A | x→f→i→y | NODE 5  C(8) | | |
| [6] | B | x→b→e→h→y | LINK h  A(10-6) | | |
| [7] | C | x→f→i→y | LINK i  B(11) | | |

| NODE ID | LINK ID |
|---|---|
| 1 | x |
| 1 | a |
| 2 | c |
| 4 | h |
| 6 | y |

FIG.15E

| NODE ID | LINK ID |
|---------|---------|
| 1 | x |
| 1 | a |
| 2 | D |
| 3 | E |
| 4 | h |
| 6 | y |

FIG.16

| NODE ID | LINK ID | OSPF COST | ETC. | ERROR RATE | TRANSMISSION DELAY TIME [ms] | NODE MTBF [MONTH] |
|---|---|---|---|---|---|---|
| 1 | x | 4 | ... | $10^{-8}$ | 5 | 36 |
| 1 | a | 5 | ... | $10^{-8}$ | 5 | 36 |
| 2 | c | 7 | ... | $10^{-6}$ | 12 | 24 |
| 4 | h | 2 | ... | $10^{-5}$ | 14 | 7 |
| 6 | y | 5 | ... | $10^{-8}$ | 5 | 12 |

FIG.17

| ROW | TOTAL COST | COURSE | NONCONFORMING PORTION 1 | NONCONFORMING PORTION 2 | NONCONFORMING PORTION 3 |
|---|---|---|---|---|---|
| (1) | 14 | x→a→c→h→y | LINK h  A($10^{-5}$) | NODE 4  C(7) |  |
| (2) | 14 | x→a→d→e→h→y | LINK d  A($10^{-7}$) | NODE 4  C(7) | LINK h  A($10^{-7}$) |
| (3) | 15 | x→f→i→y | LINK i  B(11) |  |  |
| (4) | 15 | x→b→e→h→y | LINK h  A($10^{-7}$) |  |  |
| (5) | 17 | x→j→k→i→y | NODE 7  C(5) | ⋮ |  |
| ⋮ | ⋮ | ⋮ |  |  |  |

FIG.22

| ROW | CONSTRAINING CONDITION | COURSE | NONCONFORMING PORTION 1 | NONCONFORMING PORTION 2 | NONCONFORMING PORTION 3 |
|---|---|---|---|---|---|
| [1] | A B C | NO COURSE | | | |
| [2] | A B | NO COURSE | | | |
| [3] | B C | x→a→d→e→h→y | LINK a  A(···) | | |
| [4] | C A | NO COURSE | | | |
| [5] | A | NO COURSE | | | |
| [6] | B | x→j→k→i→y | LINK k  A(···) | | |
| [7] | C | NO COURSE | | | |

FIG.23

| ROW | CONSTRAINING CONDITION | COURSE | NONCONFORMING PORTION 1 | NONCONFORMING PORTION 2 | NONCONFORMING PORTION 3 |
|---|---|---|---|---|---|
| [1] | A B C | NO COURSE | | | |
| [2] | A B | x→b→c→h→y | LINK b  C(⋯) | | |
| [3] | B C | x→a→d→e→h→y | LINK a  A(⋯) | | |
| [4] | C A | NO COURSE | | | |
| [5] | A | x→m→e→h→y | LINK m  C(⋯) | LINK h  B(⋯) | |
| [6] | B | x→j→k→o→y | LINK j  A(⋯) | LINK o  A(⋯) | |
| [7] | C | x→a→c→p→y | LINK a  A(⋯) | LINK p  A(⋯) | |

FIG.24

| ROW | CONSTRAINING CONDITION | COURSE | NONCONFORMING PORTION 1 | NONCONFORMING PORTION 2 | NONCONFORMING PORTION 3 |
|---|---|---|---|---|---|
| [1] | A B C | NO COURSE | | | |
| [2] | A B | x→b→c→h→y | LINK h  C(…) | | |
| [3] | B C | x→a→d→e→o→y | LINK e  A(…) | | |
| [4] | C A | x→f→k→o→y | LINK f  B(…) | | |
| [5] | A | x→m→e→h→y | LINK m  B(…) | LINK h  C(…) | |
| [6] | B | x→j→k→h→y | LINK j  C(…) | LINK h  C(…) | |
| [7] | C | x→a→c→o→y | LINK a  C(…) | LINK p  A(…) | |

COURSE SEARCHING METHOD AND NODE DEVICE

CROSS-REFERENCE TO RELATED APPLICATIONS

This application is a U.S. continuation application filed under 35 USC 111a and 365c of PCT application PCT/JP2009/066372, filed Sep. 18, 2009. The foregoing application is hereby incorporated herein by reference.

FIELD

The embodiments discussed herein are related to a course searching method and a node device.

BACKGROUND

Japanese Laid-open Patent Publication No. 2007-74055 discloses a network resource control method including steps of discriminating whether an available resource amount of a dynamic control network DN is proper at a dynamic control resource control apparatus RC in the communication system CS; and adjusting the available resource amount of the dynamic control network DN by establishing or releasing a path in the network when the discrimination indicates that the resource amount is improper.

Japanese Laid-open Patent Publication No. 2009-55357 discloses averting situations where a specific communications network occupies resources in a situation where communication path allocation requests are generated in a short time, in a concentrated manner.

SUMMARY

According to an aspect of the embodiment, a node device for searching for a course between a start point and an end point in a network under a plurality of constraining conditions, includes a holding unit configured to hold the constraining conditions corresponding to node devices forming the network, links connecting the node devices, and indexes corresponding to the node devices and the links as network topology information; a making unit configured to make combinations of the constraining conditions from which a removed part of the constraining conditions is removed; a searching unit configured to search for the course between the start point and the end point under the made constraining conditions obtained by the making unit; a joining unit configured to obtain a joined result by joining the successfully searched for course to the network topology information; and a presenting unit configured to compare a piece of the network topology information corresponding to course information of the successfully searched for course with the removed part of the constraining conditions, extract a nonconforming portion which does not conform to the constraining conditions, store the joined result and the extracted nonconforming portion in a result list, and present the result list.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 6 illustrates an exemplary structure of a link state packet;
FIG. 7 illustrates an exemplary structure of the link state packet;
FIG. 8 illustrates network topology information;
FIG. 12 illustrates a joined result;
FIG. 13 illustrates a result list;
FIG. 15E illustrates the operation of the re-search candidate extracting unit;
FIG. 16 illustrates a table of the joined result;
FIG. 17 illustrates a result list;
FIG. 22 illustrates a result list of a first case;
FIG. 23 illustrates a result list of a second case;
and
FIG. 24 illustrates a result list of a third case.

DESCRIPTION OF EMBODIMENTS

In recent years, a service called Just In Time service (JiT) has become ready to launch by a communication carrier. The purpose of the service is to shorten a time duration up to provision of a line service which ordinarily takes several months to several weeks or several days.

A basic technique for supporting JiT may be Generalized Multi-Protocol Label Switching (GMPLS). GMPLS, which operates a network with autonomous decentralization, is being discussed in Internet Engineering Task Force (IETF), Common Control and Measurement Plane (CCAMP)-Working Groop (WG), Optical Internetworking Forum (OIF), International Telecommunication Union (ITU) and so on and is undergoing standards work.

By introducing GMPLS, it is possible for network elements (hereinafter, referred to as nodes) to autonomously detect a network topology such as a neighboring relationship, the number of optical fibers in the nodes and available bandwidth information, and automatically structure a course between nodes requested by a user.

Figure 1A:
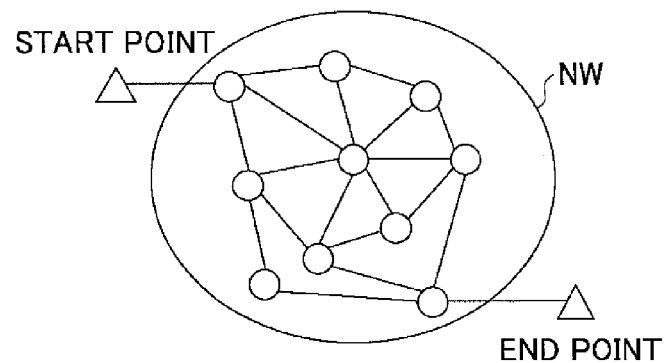
FIG. 1A illustrates GMPLS.
Figure 1B:
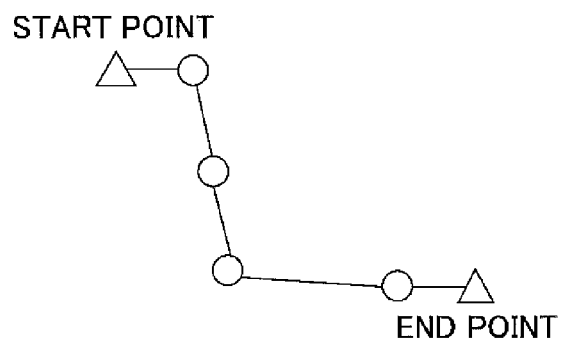
FIG. 1B illustrates the GMPLS.
Figure 2A:
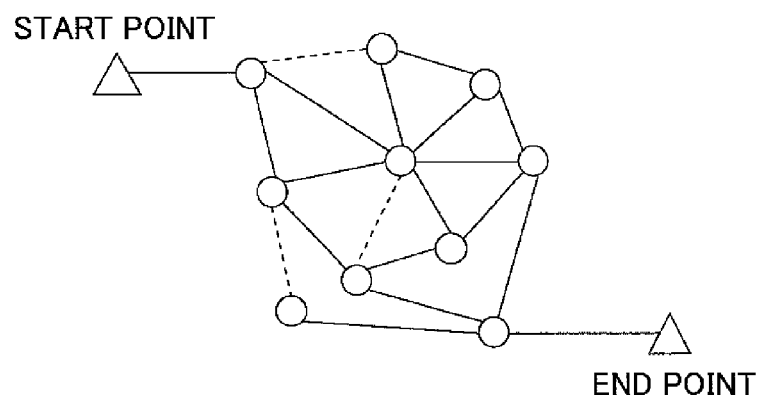
FIG. 2A illustrates the GMPLS.
Figure 2B:
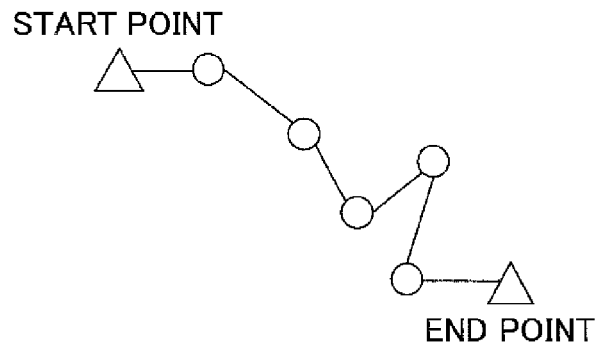
FIG. 2B illustrates the GMPLS.

With GMPLS, the user may not consider a network NW illustrated in FIG. 1A. Referring to FIG. 1B, by designating a start point and an end point, a path between the start point and the end point is automatically constructed. Referring to FIG. 2A, it may be possible to automatically construct a course as illustrated in FIG. 2B between nodes while adding constraining conditions such as "passing through courses having a predetermined line quality or more" in searching for the courses using GMPLS. Referring to FIG. 2A, a broken line indicates a course having a poor quality.

As to the constraining conditions, an index related to transmission quality, an index related to functions and reliabilities of hardware and software on the course or the like is ordinarily effective. In the GMPLS, a technique of searching for the courses based on various constraining conditions is referred to as Constrained Shortest Path Fast (CSPF). The shortest course is calculated by the following mechanism.

Figure 3A:
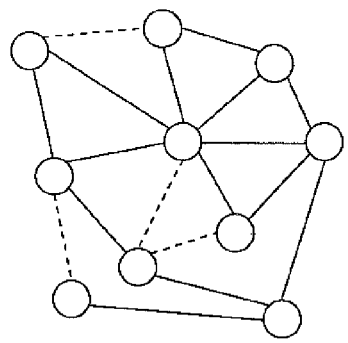
FIG. 3A illustrates OSPF.
Figure 3B:
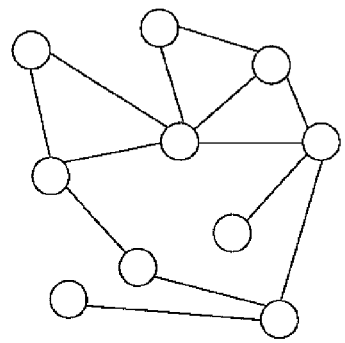
FIG. 3B illustrates the OSPF.
Figure 3C:
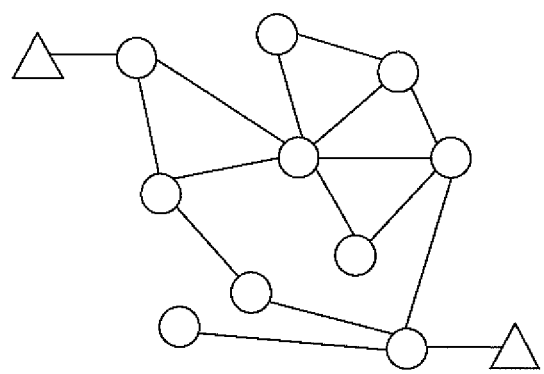
FIG. 3C illustrates the OSPF.

Referring to FIG. 3A, all constraining conditions are applied to information of network topology, and parts which do not conform to the constraining conditions in the routes (routes having a poor quality) are temporarily removed as illustrated in FIG. 3B. With this, an object (a network graph) to be searched for is determined. Next, the shortest course having the least accumulation of an OSPF cost is uniquely determined by searching the network graph illustrated in FIG. 3C with an algorithm of Open Shortest Path First (OSPF). The determined shortest course is expressed by nodes from the start point to the end point and a link forming a course between the nodes.

However, if the shortest course is not found using the CSPF, the user may not specifically know where a problem is in the various constraining conditions from the user and the network. Therefore, the user may spend an excessive amount of time for determining whether conditions for providing services (constraining conditions) are reviewed or specific portions of the network the user are improved. As a result, there is a problem that the provision of the service may delay.

The user does not specifically know where the problem is in the network because the CSPF is used to search for the course. The CSPF temporarily removes a portion which does not conform to the constraining conditions from the network topology. Therefore, only existence or non-existence of the shortest course can be known. The user spends the excessive time for determining the problem because the user reviews the constraining conditions relative to the enormous amount of network topology information.

The greater the number of the constraining conditions is, the greater the variable range of parameters of the constraining conditions is, or the more the constraining conditions closely relate to service providing conditions, the more the time for adjusting the constraining conditions becomes. Further, an excessive time is spent in specifying a portion of the network and checking the specified portion. This is because a course to be checked constantly varies depending on the start point, the end point and the constraining conditions. The result of the check may be useful under one circumstance, but may not be used at all under another circumstance. When checks under all circumstances are performed in advance (for example, extracting the shortest courses for combinations of all start points and all end points), the calculation amount and the course information amount become enormous to thereby increase a load on the device and constantly used memories. Therefore, it is disadvantageous to check under all circumstances in advance. Further, the conditions for providing the services are reviewed at a time different from a time for improving network resources. Therefore, an order of the review and the improvement enabling a faster solution is hard to be considered.

Preferred embodiments of the present invention will be explained with reference to accompanying drawings.

<Structure of Node Device>

Figure 4:
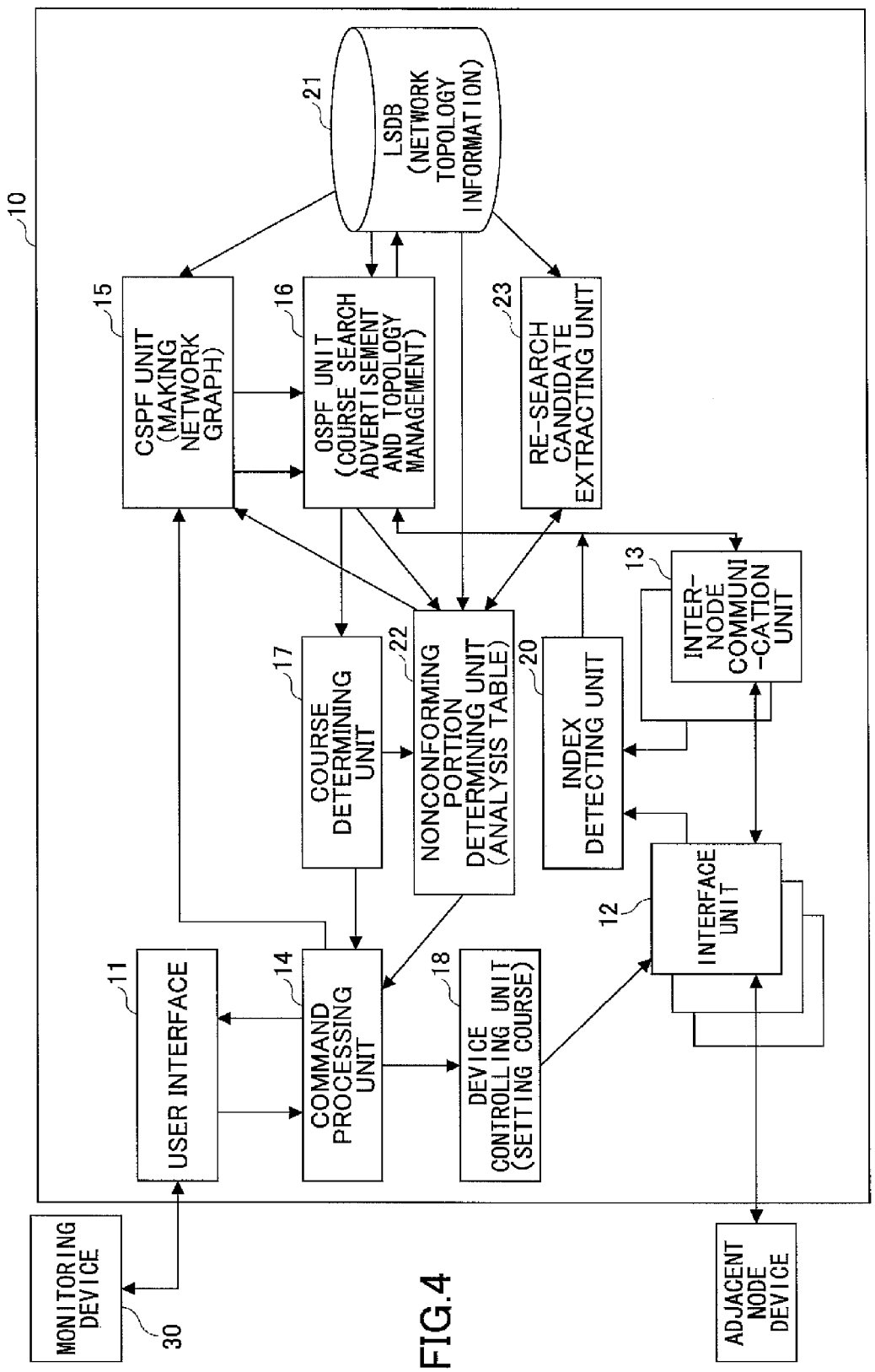
FIG. 4 illustrates an exemplary structure of a node device.

FIG. 4 illustrates a structure of the node device having an automatic path generating function of GMPLS. Referring to FIG. 4, a node device 10 is connected to a monitoring device 30 of a network by a user interface 11. The node device 10 is connected to another adjacent node device to exchange data (main signals). The communication of the GMPLS is performed by an inter-node communication unit 13.

A flow of generating the automatic path in GMPLS starts after inputting a command in which a start point, an end point and constraining conditions are included in the monitoring device 30. This command passes through the user interface 11 which sends the command to a command processing unit 14. The command processing unit 14 associates the constraining conditions in the command with an index of network topology information and sends the associated constraining conditions and the index to a CSPF unit 15.

The CSPF unit 15 makes a network graph from which course information not conforming with the constraining conditions are completely removed using network topology information stored in a LSDB 21, and requests an OSPF unit 16 to perform a course calculation.

The OSPF unit 16 circulates from the starting point to the end point on the network graph thereby calculating the shortest course, and gives the calculation result to a course determining unit 17.

The course determining unit 17 determines whether there is a calculated course and whether the calculated course has a contradiction, and sends the determined result to the command processing unit 14. The command processing unit 14 which has received the determined result requests a device controlling unit 18 to set the course. The device controlling unit 18 automatically makes a path with a GMPLS function. When the path is made, the issue is reported to the monitoring device 30 via the user interface unit 11 as a response.

An index detecting unit 20 autonomously collects indexes such as a line bit error rate for each link, a transmission delay (distance) time and a mean time between failures MTBF) of an own node device. The collected indexes are reflected in the network topology information stored in the LSDB 21 by a topology managing function of the OSPF unit 16. Further, the topology information is advertised on the entire network by advertizing on adjacent node devices via the inter-node communication unit 13 as a link state packet of the OSPF unit 16. At this time, the link state packet of the OSPF unit 16 advertises for each link. Therefore, the indexes of the node devices having the same values are advertised to all of the links belonging to the node devices.

When the course determining unit 17 has not determined whether there is a calculated course (no calculated course has been found), the nonconforming portion determining unit 22 extracts a case limited only by certain constraining conditions and a case limited by combinations of all constraining conditions. For example, the constraining conditions include a constraint A, a constraint B and a constraint C; as limited patterns of the constraining conditions, the constraint A only, the constraint B only, the constraint C only, the constraint A and the constraint B, the constraint B and the constraint C, and the constraint C and the constraint A are extracted. The nonconforming portion determining unit 22 sequentially performs a course search for with the constraining conditions by the CSPF unit 15 with respect to the extracted cases.

With this, the CSPF unit 15 removes a portion which does not conform to the cases from the network topology to thereby make the network graph. Thereafter, the network graph is searched for by the OSPF unit using the OSPF algorithm to obtain the course and the obtained course is reported to the nonconforming portion determining unit 22. In the nonconforming portion determining unit 22, table information pieces, i.e., course information pieces of the reported cases (a node ID and a link ID) and the network topology information, are joined using a JOIN operation. Said differently, the network topology information is searched for using the node ID and the link ID of the course information. The network topology obtained by the search becomes the joined result. The node ID of the nonconforming portion is obtained from the joined result.

When the course determining unit 17 has not determined whether there is a calculated course (no calculated course has been found), the re-search candidate extracting unit 23 receives the start point and the end point from the nonconforming portion determining unit 22, calculates all possible courses connecting the start point and the end point, and reports the possible courses to the nonconforming portion determining unit 22. The re-search candidate extracting unit 22 is used in a Second Embodiment described later.

First Embodiment

Figure 5:
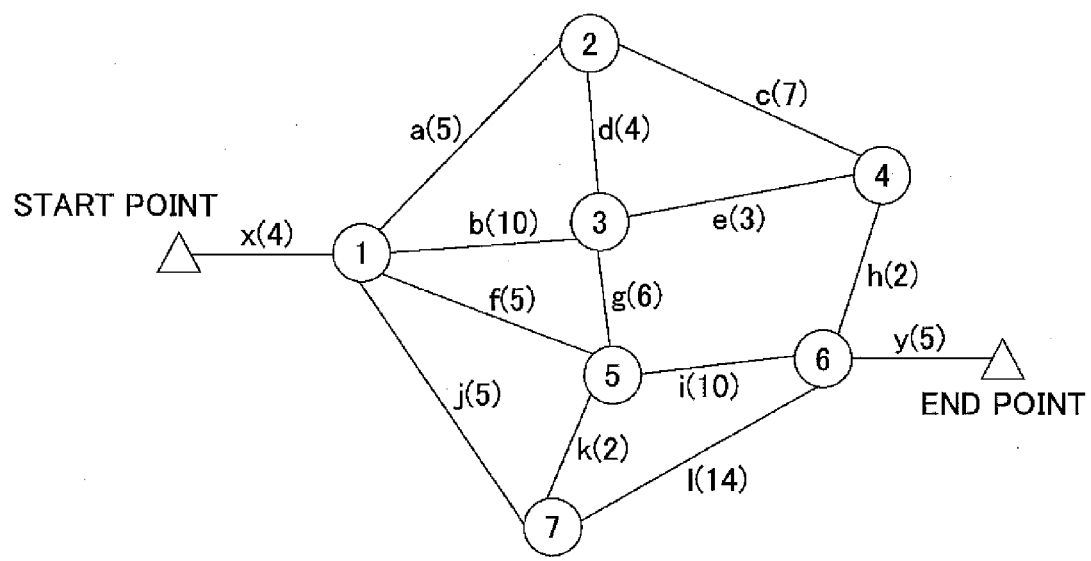
FIG. 5 illustrates an exemplary structure of a network.

FIG. 5 illustrates an exemplary structure of a network of a First Embodiment. Circular marks "o" designate nodes, and numbers inside the circular marks "o" designate node IDs. Reference symbols "a" to "l" designate link IDs, and parentheses on the right of the reference symbols "a" to "l" designate OPSF costs. The OPSF costs are set by a user for each link. For example, the OPSF costs become smaller as the bandwidths become greater.

The description is based on the premise that the following three constraining conditions are designated for the network illustrated in FIG. 5 by the user.
Constraint A: Line bit error rates (BER) for each link is $10^{-6}$ (one error per one million bits) or smaller.
Constraint B: Transmission delay times for each link are 10 ms or smaller.
Constraint C: Mean time between failures (MTBF) for each node device are 12 months or greater.

These indexes which are to be considered are autonomously collected by the index detecting units 20 of the node devices and the monitoring devices 30 connected to the node devices. The collected indexes are reflected in the network topology information stored in the LSDB 21 by the topology managing function of the OSPF unit 16. The network topology information is advertised to an adjacent node device.

In order to advertise the network topology information to the adjacent node device, there is used a link state packet of which fields are extended as illustrated in FIG. 6 and FIG. 7. Type 1 to type 16 of the link state packet are the same as an ordinarily available link state packet. Type XX (XX is, for example, 17) is used to advertise line bit error rates for each link. Type XY (XY is, for example, 18) is used to advertise transmission delay times for each link. Type YY (YY is, for example, 19) is used to advertise mean time between failures (MTBF) of the node device.

With this, in the network illustrated in FIG. 5, the network topology information illustrated in FIG. 8 is shared by all node devices (node devices having node IDs 1 to 7 in FIG. 5). Referring to FIG. 8, the network topology information is collected for each node ID and each link ID. The expression of the error rate of "10^-8" indicates "$10^{-8}$". The unit of the transmission delay time is msec (ms). The unit of the node MTBF is month.

When the network topology information is shared by all node devices, if the information of the start point and the end point is input, the route is calculated using the network topology information by the CSPF unit 15 and the OSPF unit 16. The following description is based on the premise that the course is not found by the course determining unit 17. If the course is found, it is sufficient to send a result to a user as in an ordinary technique, and explanation thereof is omitted.

In a case where the course is not found by the course determining unit 17, the nonconforming portion determining unit 22 extracts a case where only a certain constraining condition is limited and a case where all constraining conditions are limited. The certain constraining condition includes, as the limited patterns, the constraint A only, the constraint B only, the constraint C only, the constraint A and the constraint B, the constraint B and the constraint C, and the constraint C and the constraint A.

Figure 9A:
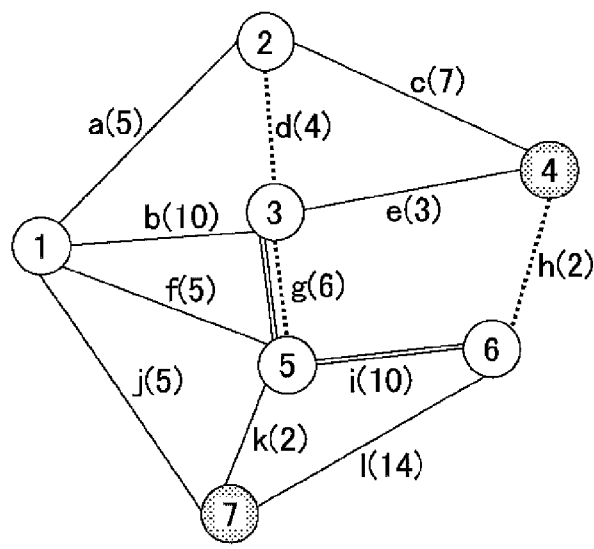
FIG. 9A illustrates production of a network graph.
Figure 9B:
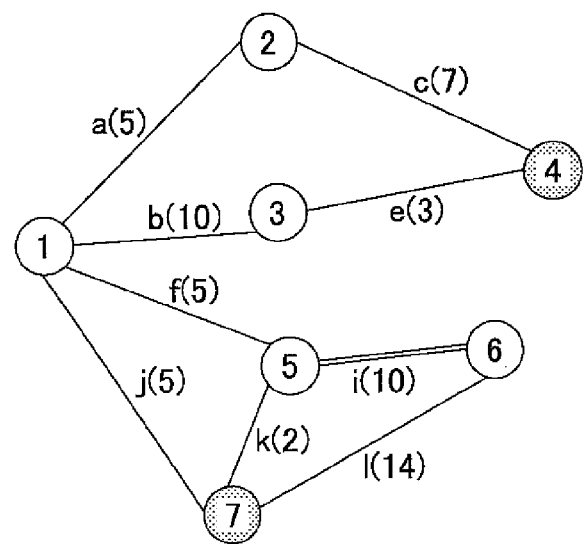
FIG. 9B illustrates the production of the network graph.

Then, in the extracted cases, the courses are sequentially searched for while applying constraining conditions by the CSPF unit 15. For example, the case where only the constraint A is limited is described. The CSPF unit receiving the condition limited only to the constraint A from the nonconforming portion determining unit 22 removes a link which does not conform to the constraint A (the link of the broken line in FIG. 9A) from the network (the network topology information) illustrated in FIG. 9A to thereby make the network graph illustrated in FIG. 9B. The links of the double line indicate links which do not conform to the constraint B. The shaded nodes indicate nodes which do not conform to the constraint C.

Figures 10, 11:
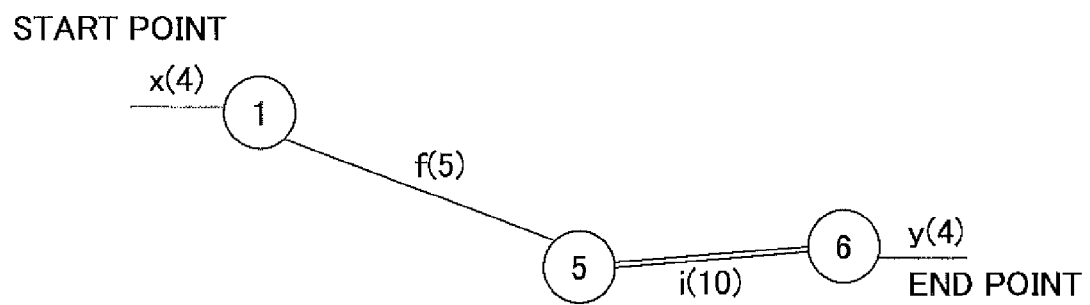
FIG. 10 illustrates the shortest course.
FIG. 11 illustrates course information.

Thereafter, the OSPF unit 16 searches the network graph using the OSPF algorithm to thereby obtain the shortest course illustrated in FIG. 10. The obtained shortest course is reported to the nonconforming portion determining unit 22 as course information including the node ID and the link ID illustrated in FIG. 11.

The nonconforming portion determining unit 22 joins table information, i.e., the reported course information illustrated in FIG. 11 and the network topology information illustrated in FIG. 8, by a JOIN operation to obtain a joined result illustrated in FIG. 12. Said differently, the network topology information is searched for using the node ID and the link ID of the course information. The network topology obtained by the search becomes the joined result.

The nonconforming portion determining unit 22 finds no course using the constraint A, the constraint B and the constraint C, and finds a course using only the constraint A. Therefore, it is known that the obtained course includes the link which does not conform to the constraint B or the constraint C. Then, a joined information table as the joined result illustrated in FIG. 12 is referred to in order to obtain the constraining conditions. The nonconforming portion determining unit 22 compares the constraint B and the constraint C (the error rate of $10^{-6}$ or smaller and the node MTBF of 12 months or greater) with the constraining conditions in the joined information table as the joined result illustrated in FIG. 12. Thus, it is known that the node ID=5 and the link ID=i in FIG. 12 do not conform the constraint C (MTBF=8). Thereafter, the above course information (the link ID=i) and the above nonconforming portion (the constraint C (MTBF=8)) are stored in a result list illustrated in FIG. 13. The constraint C constrains the node device, and the nonconforming portion becomes the node ID.

By performing all cases in which the remaining constraining conditions are limited (the constraint A only, the constraint B only, the constraint A and the constraint B, the constraint B and the constraint C, and constraint C and the constraint A), the result list illustrated in FIG. 13 is made for specifying a problem. Then, the result list illustrated in FIG. 13 is reported to the user.

Flowchart of First Embodiment

Figure 14:
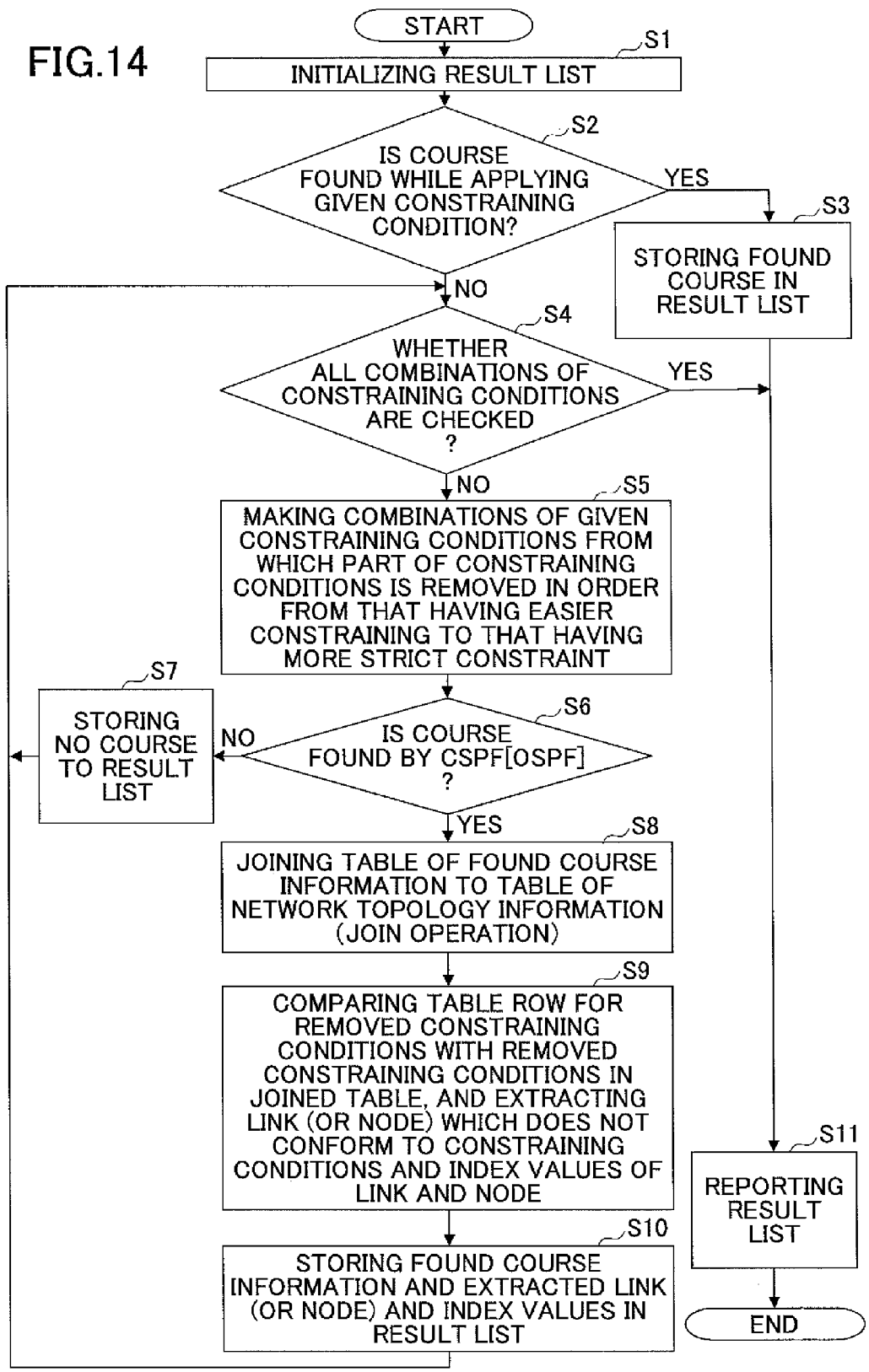
FIG. 14 is a flowchart of a first embodiment.

FIG. 14 is a flowchart of the First Embodiment. The process in the flowchart can be performed by any node device whose course is requested to be searched for by the user.

Referring to FIG. 14, the nonconforming portion determining unit 22 initializes the result list in step S1. In step S2, the course determining unit 17 determines whether the CSPF unit 15 and the OSPF unit 16 find the course while applying the constraining conditions given by the user. If the course is found, the found course is stored in the result list, and the process goes to step S11.

If the course is not found, the nonconforming portion determining unit 22 determines whether all cases, i.e., the constraint A only, the constraint B only, the constraint C only, the constraint A and the constraint B, the constraint B and the constraint C, and the constraint C and the constraint A, are checked in step S4. If all cases are not finished being checked, the nonconforming portion determining unit 22 makes combinations from which a part of the constraints is removed from the combinations of the constraining conditions (constraints A, B and C) given in step S5 in an order from, for example, the combination having easier constraint to the combination having more strict constraint (the combination having fewer constraints to the combination having more constraints).

The nonconforming portion determining unit 22 determines whether the course is found by the CSPF unit 15 and the OSPF unit 16 using the combination made in step S6. If the course is not found, the nonconforming portion determining unit 22 stores "no course" in the result list in step S7, and the process goes to step S4. If the course is found, the nonconforming portion determining unit 22 joins tables, i.e., the course information found in step S8 and the network topology information.

Next, the nonconforming portion determining unit 22 compares all the removed constrains in the search with the joined result in step S9 to extract nonconforming portions (node or link) which do not conform to the conditions and the index values of the nonconforming portions. The nonconforming portion determining unit 22 stores the course information found in step S10, the nonconforming portion and index values of the course information and the nonconforming portion in the result list, and the process goes to step S4.

Meanwhile, if all the combinations of the constraining conditions are finished being checked in step S4, the nonconforming portion determining unit 22 reports the result list in step S11.

Second Embodiment

In the following description, the constraining conditions designated by the user are the same as the First Embodiment. With this, in the network illustrated in FIG. 5, the network topology information illustrated in FIG. 8 is shared by all of the node devices.

When the network topology information is shared by all of the node devices, if the information of the start point and the end point is input by a user, the route is calculated using the network topology information by the CSPF unit 15 and the OSPF unit 16. The following description is based on the premise that the course is not found by the course determining unit 17. In a case where the course is not found by the course determining unit 17, the course determining unit 17 requests the nonconforming portion determining unit 22 to process.

The nonconforming portion determining unit 22 sends information of the start point and the end point to the re-search candidate extracting unit 23.

Figure 15A:
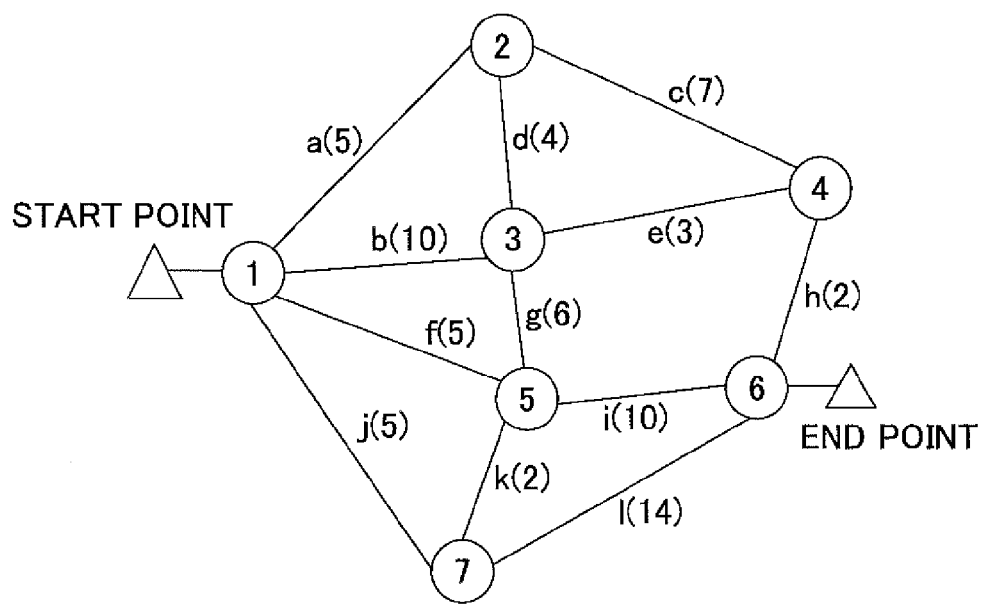
FIG. 15A illustrates operation of a re-search candidate extracting unit.
Figure 15B:
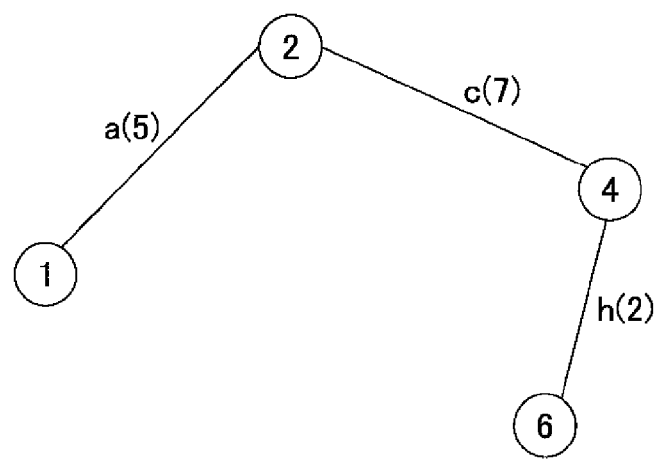
FIG. 15B illustrates operation of the re-search candidate extracting unit.
Figures 15C, 15D:
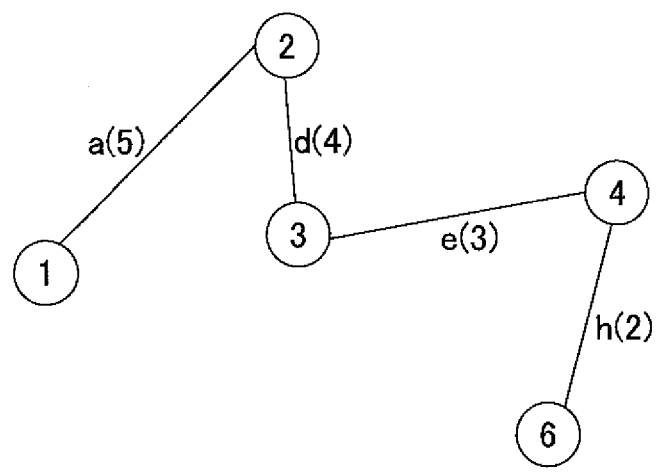
FIG. 15C illustrates the operation of the re-search candidate extracting unit.
FIG. 15D illustrates the operation of the re-search candidate extracting unit.

The re-search candidate extracting unit 23 extracts all possible courses from the start point to the end point from the network topology information, and reports the extracted courses to the nonconforming portion determining unit 22. For example, in a network illustrated in FIG. 15A, courses illustrated in FIG. 15B and FIG. 15C are calculated. The course illustrated in FIG. 15B is reported as course information illustrated in FIG. 15D to the nonconforming portion determining unit 22. The course illustrated in FIG. 15C is reported as course information illustrated in FIG. 15E to the nonconforming portion determining unit 22.

Figure 15E:
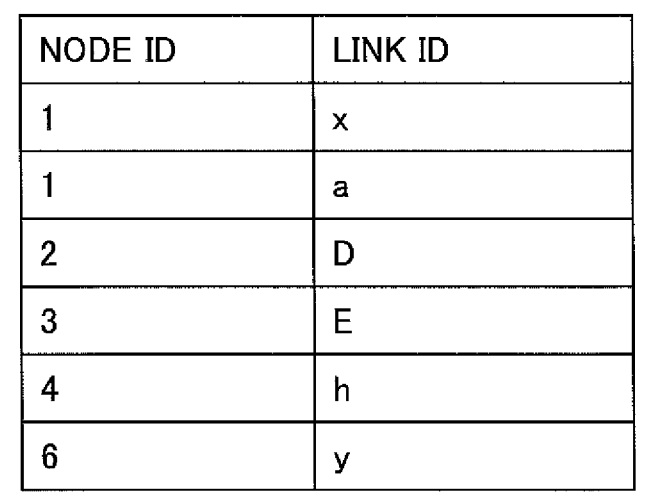

The nonconforming portion determining unit 22 joins table information, i.e., the reported course information illustrated in FIG. 15D and FIG. 15E and the network topology information illustrated in FIG. 8, by a JOIN operation to obtain a joined result illustrated in FIG. 16. FIG. 16 illustrates a table joining the course information illustrated in FIG. 15D and the network topology as the joined result.

The nonconforming portion determining unit 22 finds no course using the constraints A, B and C given by the user. Therefore, it is known that the table of the joined result includes the link which does not conform to any of the constraint A, the constraint B or the constraint C or all of the constraints A, B and C. Then, the table of the joined result illustrated in FIG. 16 is referred to in order to obtain the constraining conditions. The nonconforming portion determining unit 22 compares the constraints A, B and C (the error rate of $10^{-6}$ or smaller, the transmission delay of 10 ms or smaller and the node MTBF of 12 months or greater) with the constraining conditions in the table of the joined result. Thus, it is known that the node ID=4 and the link ID=h in FIG. 16 do not conform to the constraints A, B and C. Thereafter, the above course information and the extracted result of the nonconforming portion are stored in a result list. At this time, because the constraint C constrains the node devices, the nonconforming portions are the node device 4 and the link h as in the first row (1) in FIG. 17.

After all of the courses undergo the processes described above, the result list illustrated in FIG. 17 is made as determination information for specifying problems. Then, the result list is sorted in an order of total costs of the courses. Then, the result list illustrated in FIG. 17 is reported to the user.

Flowchart of Second Embodiment

Figure 18:
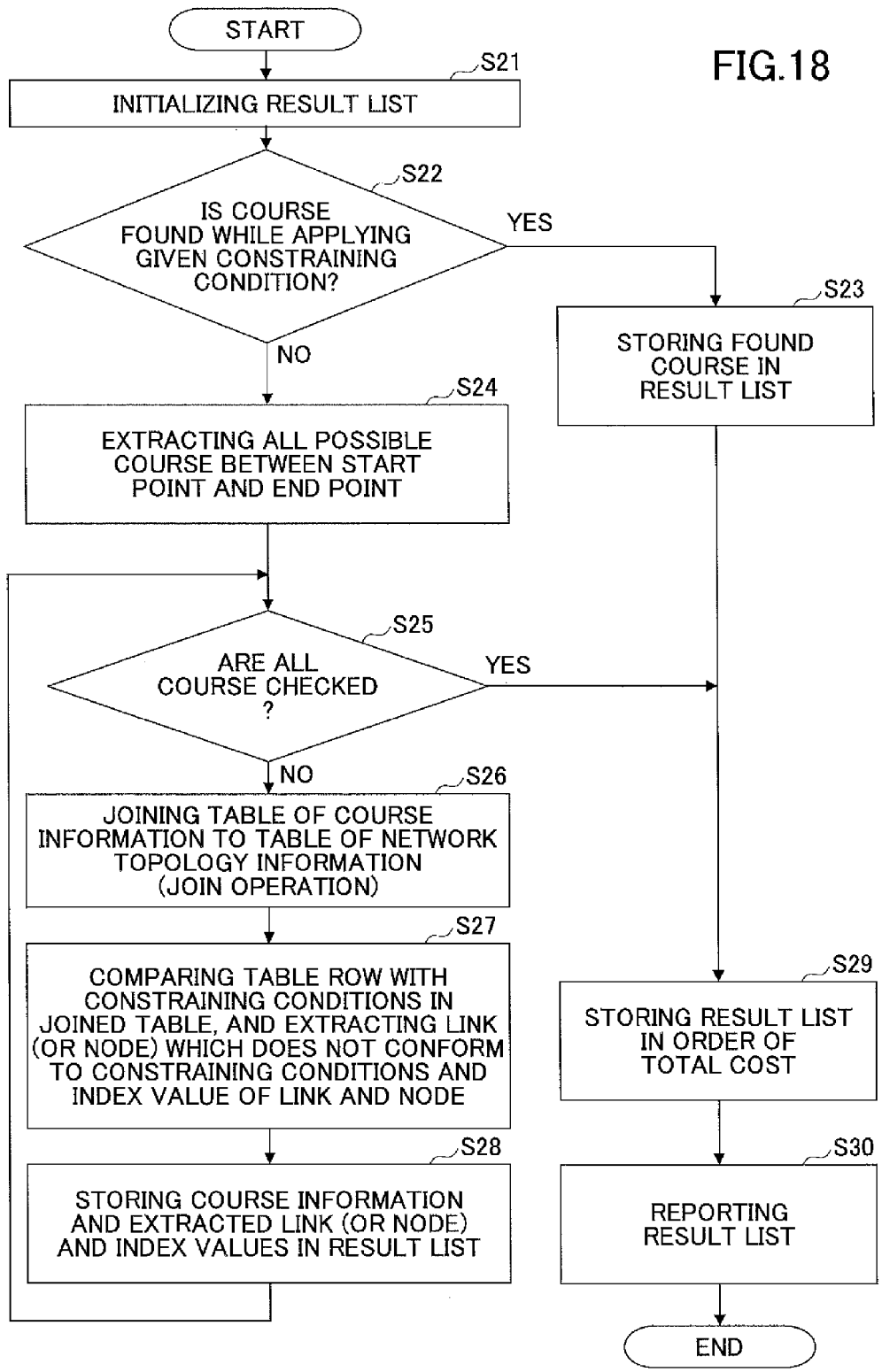
FIG. 18 is a flowchart of a second embodiment.

FIG. 18 is a flowchart of the Second Embodiment. The process in the flowchart can be performed by any node device to whose course is requested to be searched for by the user.

Referring to FIG. 18, the nonconforming portion determining unit 22 initializes the result list in step S21. In step S22, the course determining unit 17 determines whether the CSPF unit 15 and the OSPF unit 16 find the course while applying the constraining conditions given by the user. If the course is found, the found course is stored in the result list, and the process goes to step S29.

If the course is not found, the re-search candidate extracting unit 23 extracts all possible courses from the start point to the end point in step S24. In step S25, it is determined whether all courses are checked. If the all courses are not checked yet, in step S26, the nonconforming portion determining unit 22 joins table information, i.e., the reported course information illustrated in FIG. 15D and FIG. 15E and the network topology information illustrated in FIG. 8, by a JOIN operation to obtain a joined result illustrated in FIG. 16.

In step S27, the nonconforming portion determining unit 22 compares the table of the joined result with the constraining conditions A, B and C given by the user, and extracts nonconforming portions (node or link) which do not conform to the constraining conditions and index values of the nonconforming portions. In step S28, the course information, the nonconforming portion and the index values are stored in the result list. Then, the process goes to step S25.

Meanwhile, if all the combinations the constraining conditions are finished being checked in step S25 or step S23 is performed, the nonconforming portion determining unit 22 sorts the result list in the order of the total cost of the course and reports the result list in step S30.

Selection Between First Embodiment and Second Embodiment

A relationship between the intermediate node number of the First Embodiment and the calculation amount of the Second Embodiment is described next. For example, in the network illustrated in FIG. 5, if the node device (1) is viewed from the start point, there are 4 branches to the node devices (2), (3), (5) and (7) at the node device (1). Similarly, if the node device (2) is viewed from the node device (1), there are 2 branches to the node devices (3) and (4) at the node device (2). As described, the relationship between the node devices and the branches may be illustrated as a graph having a tree structure illustrated in FIG. 19. In this tree structure, the node device at the vertex is the node device at the start point, and the node devices at the end point are at the terminals of the branches. All numbers of the possible courses between the start point and the end point equal to the total number of the node devices at the terminals of the branches.

Figure 19:
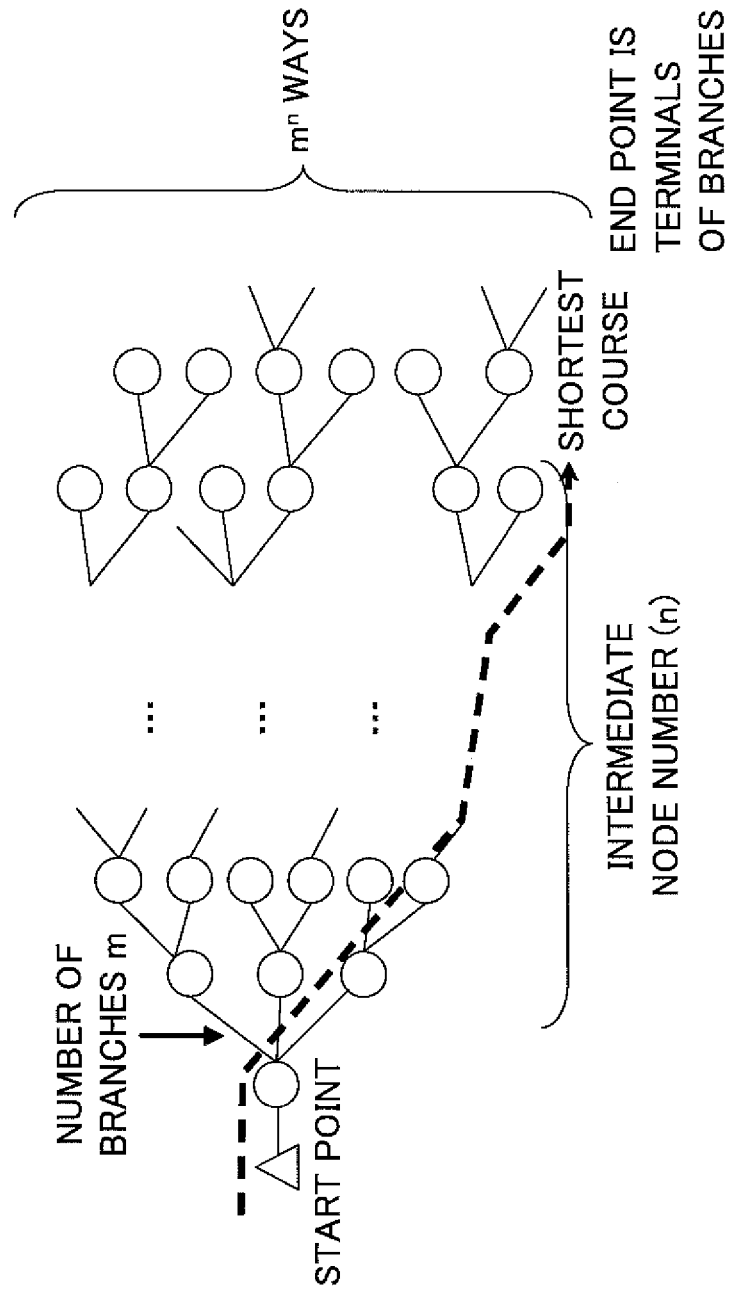
FIG. 19 illustrates a relationship between an intermediate node number and the calculation amount in the second embodiment.

Referring to FIG. 19, the total number of the terminals of branches is about $m^n$, where m designates an average branching number and n designates an intermediate node number. Provided that the average branching number is "2", the number of combinations of the First Embodiment $(2^k)-1$, where k is the number of the constraining conditions, is substantially equal to the calculation amount of the Second Embodiment. If there scarcely exists a case where the constraining conditions or more are simultaneously designated at a time of requesting to generate an ordinary path, the calculation amount does not become great regardless of the network size in the First Embodiment. The First Embodiment is advantageous in this regard.

Figure 20:
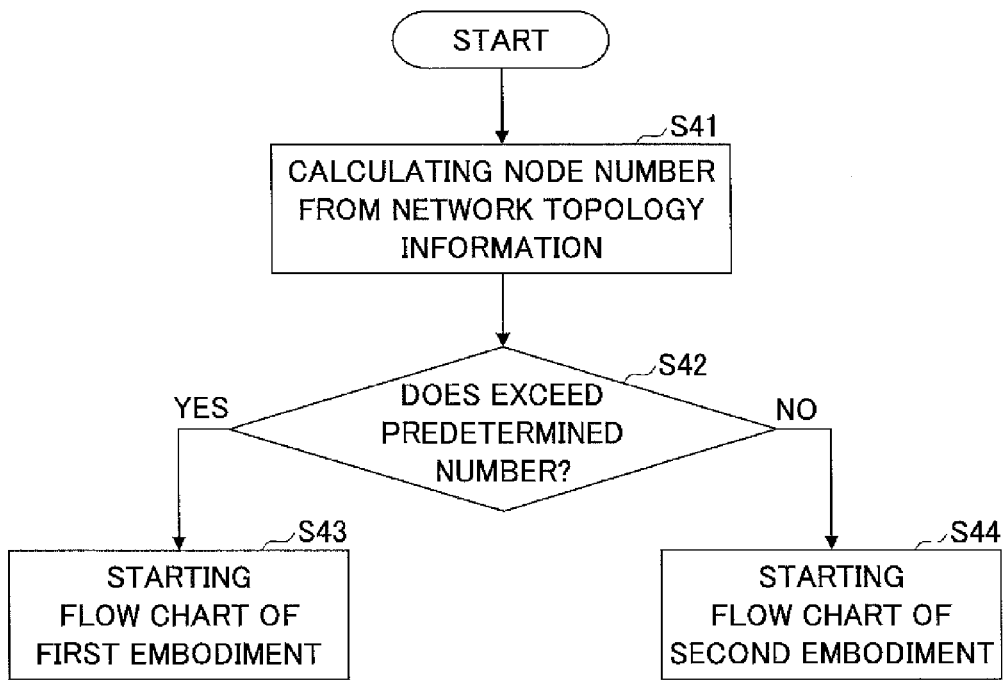
FIG. 20 is a flowchart for selecting a method of the first embodiment or a method of the second embodiment.
Figure 21:
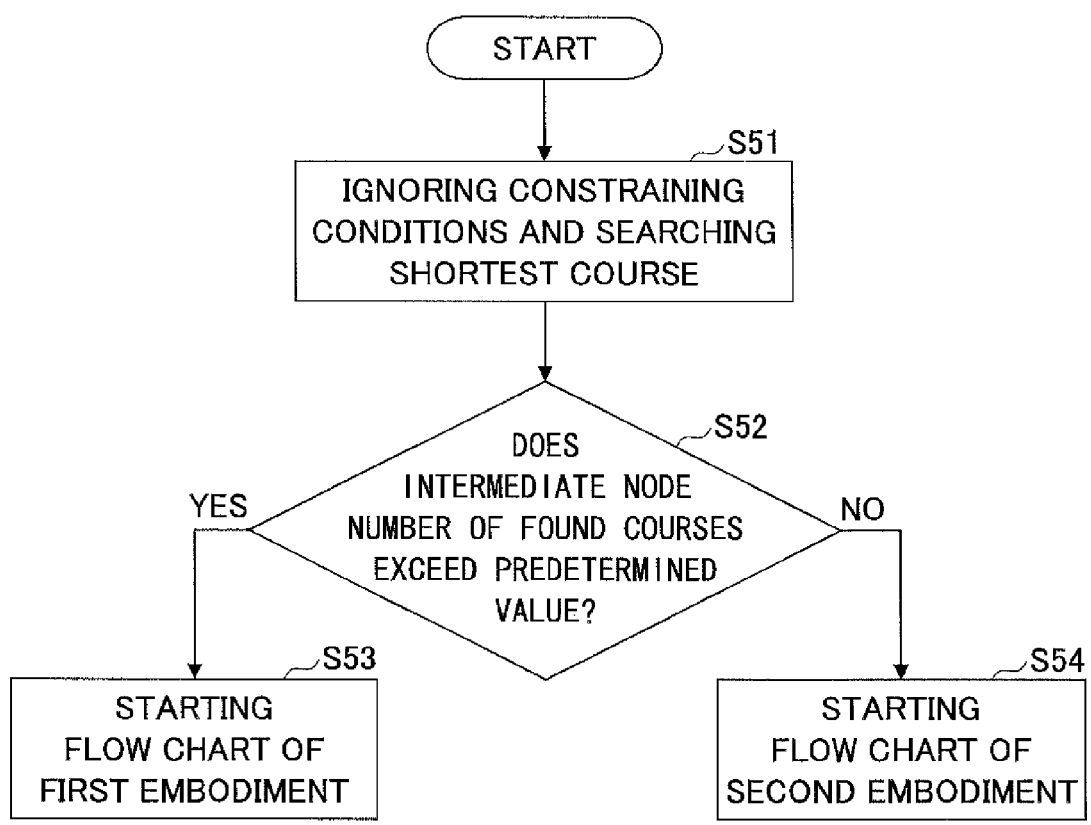
FIG. 21 is a flowchart for selecting the method of the first embodiment or the method of the second embodiment.

In this consideration, it may be possible to select the methods of the First Embodiment and the Second Embodiment. FIG. 20 and FIG. 21 are flowcharts for selecting the method of first embodiment or the method of second embodiment.

Referring to FIG. 20, the node device counts the node number (the number of nodes without counting overlapped node IDs) in the network topology information illustrated in FIG. 8 to estimate the network size in step S41. It is determined in step S42 whether the node number counted exceeds a predetermined number (for example, about ten to one hundred). If the counted node number exceeds the predetermined number, the First Embodiment is selected in step S43. Then, the flowchart illustrated in FIG. 14 is started. If the counted node number does not exceed the predetermined number, the Second Embodiment is selected in step S44. Then, the flowchart illustrated in FIG. 18 is started. This selection is provided because the greater the node number of the network becomes the greater the course number calculated in the Second embodiment becomes.

Referring to FIG. 21, in the node device, the shortest course is first searched for by completely ignoring the constraining conditions in step S51. It is determined in step S52 whether the node number counted exceeds a predetermined number (for example, ten). If the counted node number exceeds the predetermined number, the First Embodiment is selected in step S53. Then, the flowchart illustrated in FIG. 14 is started. If the counted node number does not exceed the predetermined number, the Second Embodiment is selected in step S54. Then, the flowchart illustrated in FIG. 18 is started. This selection is provided because the greater the node number of the network becomes the greater the course number calculated in the Second embodiment becomes.

<Content of Nonconforming Portion>

Next, an example of how to determine the contents of the nonconforming portions displayed for each course is described.

In a first case, the course is not found because of specific constraining conditions. This case is observed in the First Embodiment, and the result list illustrated in FIG. 22 is obtainable. If the specific constraining condition is strict for the network, the strictness may be solved (the course may be found) by relaxing the specific constraining condition. Referring to FIG. 22, a portion surrounded by an elongated circle suggests that the constraints A and C are strict. In changing the constraining conditions, a cautious determination is preferable.

In a second case, there are many nonconforming portions caused by a specific constraining condition. The second case may be observed in the First Embodiment and the Second Embodiment. In the First Embodiment, a result list illustrated in FIG. 23 is obtainable. In a manner similar to the first case, the constraining condition may be the major reason for the many nonconforming portions. Referring to FIG. 23, a portion surrounded by an elongated circle suggests that the constraint A is strict. In changing the constraining conditions, a cautious determination is preferable also in the second case.

In a third case, a specific node device or a specific link is a nonconforming portion irrespective of the calculated courses (the candidates of the courses). The third case may be observed in the First Embodiment and the Second Embodiment. In the First Embodiment, a result list illustrated in FIG. 24 is obtainable. Referring to FIG. 24, portions surrounded by elongated circles suggest that the link h does not conform to the constraint C. Therefore, it is possible to determine that the specified nonconforming portion (the link h) is to be intensively searched for.

In cased other than the first to third cases, the user may further select a candidate of the course and intensively search for a nonconforming portion on the course. The user may select the candidate of the course based on the changeable constraining conditions, the total number of the nonconforming portions or the like.

As described, with the embodiments, in the case where the course is not found by the course search with the constraining conditions, the constraining condition causing this and the problematic node and link can be efficiently adjusted or checked based on the determination information of the nonconforming portions displayed for each course as the result list. Thus, a time for solving the problem can be shortened and a lead time before providing the service can be shortened. Further, depending on the network size to which the embodiments are applied, a realistic method considering the calculation amount can be used.

Said differently, the embodiments can provide the determination information for specifying the course search.

According to a first aspect of the embodiments there is provided a node device for searching for a course between a start point and an end point in a network under a plurality of constraining conditions, including: a holding unit configured to hold the constraining conditions corresponding to node devices forming the network and links connecting the node devices and indexes corresponding to the node devices and the links as network topology information; a making unit configured to make combinations of the constraining conditions from which a removed part of the constraining conditions is removed; a searching unit configured to search for the course between the start point and the end point under the made constraining conditions obtained by the making unit; a joining unit configured to obtain a joined result by joining the successfully searched for course to the network topology information; and a presenting unit configured to compare a piece of the network topology information corresponding to course information of the successfully searched for course with the removed part of the constraining conditions, extract a nonconforming portion which does not conform to the constraining conditions, store the joined result and the extracted nonconforming portion in a result list, and present the result list.

According to a second aspect of the embodiments, there is provided a node device for searching for a course between a start point and an end point in a network under a plurality of constraining conditions, the node device including: a holding unit configured to hold the constraining conditions corresponding to node devices forming the network and links connecting the node devices and indexes corresponding to the node devices and the links as network topology information; an extracting unit configured to extract all possible courses between the start point and the end point as a re-search candidate; a joining unit configured to obtain a joined result by joining the extracted course to the network topology information; and a presenting unit configured to compare a piece of the network topology information corresponding to course information of the extracted possible courses as the re-search candidate with the constraining conditions, extract a nonconforming portion which does not conform to the constraining conditions, store the joined result and the extracted nonconforming portion in a result list, and present the result list.

According to a third aspect of the embodiments, there is provided the node device according to the first aspect, wherein the presenting unit further stores an index value of the extracted nonconforming portion in the result list for presenting the result list.

According to a fourth aspect of the embodiments, there is provided the node device according to the second aspect, wherein the presenting unit further stores an index value of the extracted nonconforming portion in the result list for presenting the result list.

According to a fifth aspect of the embodiments, there is provided a course searching method of searching for a course between a start point and an end point in a network under a plurality of constraining conditions, including: holding the constraining conditions corresponding to node devices forming the network and links connecting the node devices and indexes corresponding to the node devices and the links as network topology information; making combinations of the constraining conditions from which a removed part of the constraining conditions is removed; searching for the course between the start point and the end point under the made constraining conditions obtained by the making; obtaining a joined result by joining the successfully searched for course to the network topology information; comparing a piece of the network topology information corresponding to course information of the successfully searched for course with the removed part of the constraining conditions; extracting a nonconforming portion which does not conform to the constraining conditions; storing the joined result and the extracted nonconforming portion in a result list; and presenting the result list.

According to a sixth aspect of the embodiments, there is provided a course searching method of searching for a course between a start point and an end point in a network under a plurality of constraining conditions, including: holding the constraining conditions corresponding to node devices forming the network and links connecting the node devices and indexes corresponding to the node devices and the links as network topology information; extracting all possible courses between the start point and the end point as a re-search candidate; obtaining a joined result by joining the extracted course to the network topology information; comparing a piece of the network topology information corresponding to course information of the extracted possible courses as the re-search candidate with the constraining conditions; extracting a nonconforming portion which does not conform to the constraining conditions; storing the joined result and the extracted nonconforming portion in a result list; and presenting the result list.

According to a seventh aspect of the embodiments, there is provided the node device according to the first aspect, further including: an extracting unit configured to extract all possible courses between the start point and the end point as a re-search candidate; another joining unit configured to obtain the joined result by joining the extracted course to the network topology information; another presenting unit configured to compare another piece of the network topology information corresponding to course information of the extracted possible courses as the re-search candidate with the constraining conditions, extract a nonconforming portion which does not conform to the constraining conditions, store the joined result and the extracted nonconforming portion in the result list, and present the result list; and a selecting unit configured to select the presenting unit when a network size exceeds a predetermined size and select the other presenting unit when a network size does not exceed the predetermined size.

According to an eighth aspect of the embodiments, there is provided the node device according to the seventh aspect, wherein the network size is determined to exceed the predetermined size when a number of the node devices in the network exceeds a predetermined value.

According to a ninth aspect of the embodiments, there is provided the node device according to the seventh aspect, wherein the network size is determined to exceed the predetermined size when a number of intermediate node devices in a shortest course between the start point and the end point exceeds a predetermined value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present invention have been described in detail, it should be understood that the various changes, substitutions, and alterations could be made hereto without departing from the spirit and scope of the invention.

What is claimed is:

1. A node device for searching for a course between a start point and an end point in a network under a plurality of constraining conditions, the node device comprising:
a holding unit configured to hold the constraining conditions corresponding to node devices forming the network and links connecting the node devices and indexes corresponding to the node devices and the links as network topology information;
a making unit configured to make combinations of the constraining conditions from which a removed part of the constraining conditions is removed;
a searching unit configured to search for the course between the start point and the end point under the made constraining conditions obtained by the making unit;
a joining unit configured to obtain a joined result by joining the successfully searched for course to the network topology information; and
a presenting unit configured to compare a piece of the network topology information corresponding to course information of the successfully searched for course with the removed part of the constraining conditions, extract a nonconforming portion which does not conform to the constraining conditions, store the joined result and the extracted nonconforming portion in a result list, and present the result list.

2. A node device for searching for a course between a start point and an end point in a network under a plurality of constraining conditions, the node device comprising:
a holding unit configured to hold the constraining conditions corresponding to node devices forming the network and links connecting the node devices and indexes corresponding to the node devices and the links as network topology information;
an extracting unit configured to extract all possible courses between the start point and the end point as a re-search candidate;
a joining unit configured to obtain a joined result by joining the extracted course to the network topology information; and
a presenting unit configured to compare a piece of the network topology information corresponding to course information of the extracted possible courses as the re-search candidate with the constraining conditions, extract a nonconforming portion which does not conform to the constraining conditions, store the joined result and the extracted nonconforming portion in a result list, and present the result list.

3. The node device according to claim 1,
wherein the presenting unit further stores
an index value of the extracted nonconforming portion in the result list for presenting the result list.

4. The node device according to claim 2,
wherein the presenting unit further stores
an index value of the extracted nonconforming portion in the result list for presenting the result list.

5. The node device according to claim 1, further comprising:
an extracting unit configured to extract all possible courses between the start point and the end point as a re-search candidate;
another joining unit configured to obtain the joined result by joining the extracted course to the network topology information;
another presenting unit configured to compare another piece of the network topology information corresponding to course information of the extracted possible courses as the re-search candidate with the constraining conditions, extract a nonconforming portion which does not conform to the constraining conditions, store the joined result and the extracted nonconforming portion in the result list, and present the result list; and
a selecting unit configured to select the presenting unit when a network size exceeds a predetermined size and select the other presenting unit when a network size does not exceed the predetermined size.

6. The node device according to claim 5,
wherein the network size is determined to exceed the predetermined size when a number of the node devices in the network exceeds a predetermined value.

7. The node device according to claim 5,
wherein the network size is determined to exceed the predetermined size when a number of intermediate node devices in a shortest course between the start point and the end point exceeds a predetermined value.

* * * * *